(No Model.)
O. L. MUNGER.
CAMERA ATTACHMENT.
No. 406,934. Patented July 16, 1889.
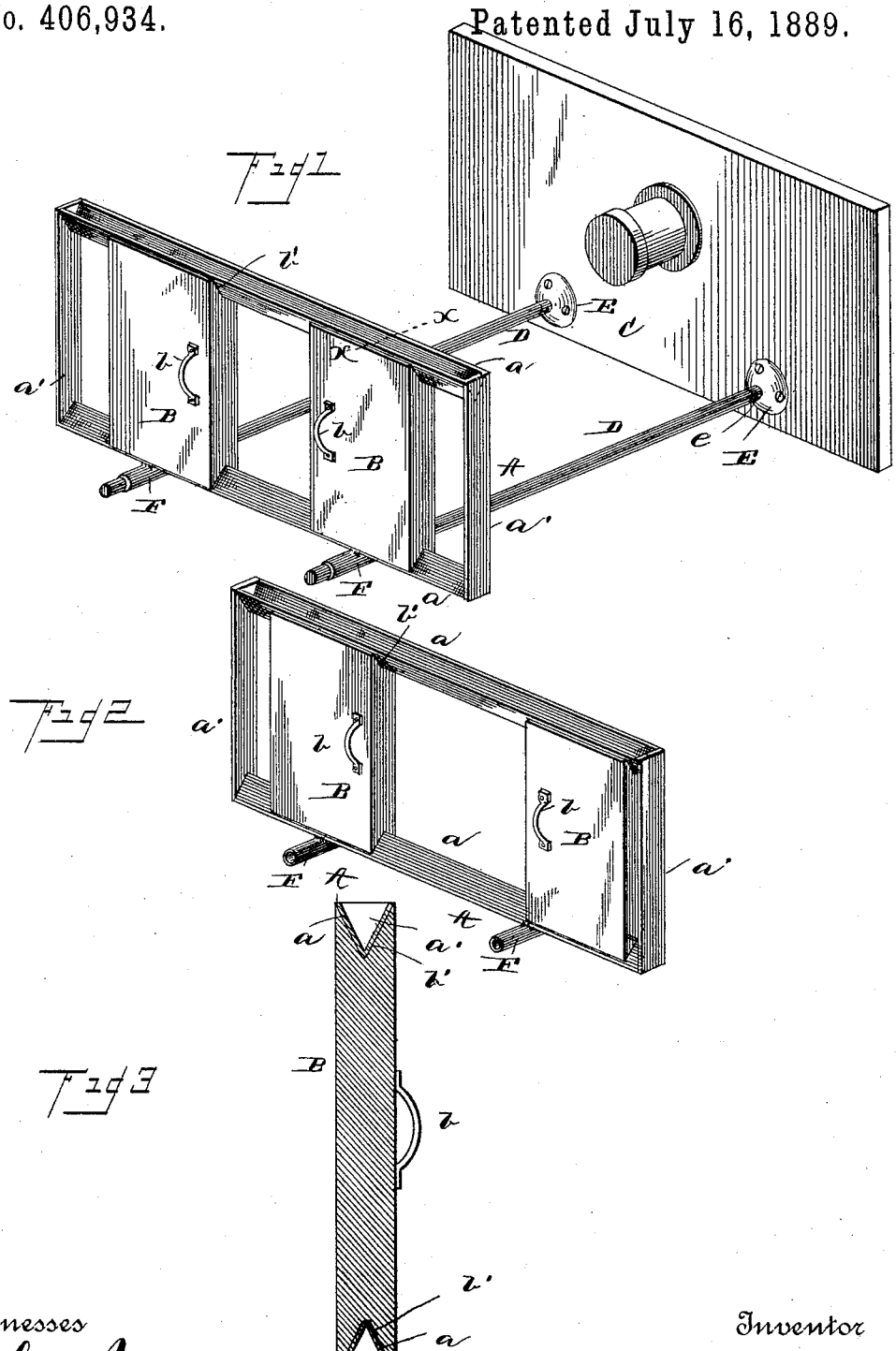

UNITED STATES PATENT OFFICE.

ORLO LENARD MUNGER, OF GRESHAM, NEBRASKA, ASSIGNOR OF ONE-HALF TO W. C. POWERS, OF SAME PLACE.

CAMERA ATTACHMENT.

SPECIFICATION forming part of Letters Patent No. 406,934, dated July 16, 1889.

Application filed January 15, 1889. Serial No. 296,398. (No model.)

*To all whom it may concern:*

Be it known that I, ORLO LENARD MUNGER, a citizen of the United States, residing at Gresham, in the county of York and State of Nebraska, have invented new and useful Improvements in Camera Attachments, of which the following is a specification.

The invention relates to improvements in camera attachments.

The object of the invention is the production of a device capable of excluding the light from portions of a negative during the exposure of other portions of the same to the action of light, thereby enabling a number of exposures of the same negative to be made, whereby a group-picture may be made from one or more objects posed in various positions without any indication on the negative of the successive exposures.

The invention consists in the construction and novel combination and arrangement of parts, hereinafter fully described, illustrated in the accompanying drawings, and pointed out in the claims hereto appended.

In the drawings, Figure 1 is a perspective view of a camera provided with my improved attachment. Fig. 2 is a detail perspective view of the frame and slides. Fig. 3 is a cross-section taken on line x x of Fig. 1.

Referring to the accompanying drawings, A designates a rectangular frame constructed of suitable material, preferably sheet metal, and provided with screens B, which are designed to exclude the light from parts of a negative while other parts are being exposed to the action of the light, whereby a number of exposures of a negative may be made without indications of the successive exposures appearing on the same. The frame A is mounted in front of a camera C upon rods D, and consists of two guide-strips a a, forming the top and bottom of the frame A, and side pieces a' a', which connect the end of the guide-strips a, to which they are secured.

The guide-strips a are V-shaped in cross-section, the apexes being arranged facing each other, and the screens B are provided with handles b to facilitate operation, and with corresponding V-shaped grooves b', whereby they are securely retained between the guide-strips and are permitted to slide in the frame A, in order that they may be arranged at any position in front of the camera to exclude the light from parts of a negative while other parts are subjected to the action of light.

The rods D are threaded at their inner ends and are screwed into disks E, which are provided with central internal threaded openings e, and are secured to the front of a camera by screws or the like. The frame A may be adjusted upon the rods D relative to the camera to regulate the exclusion of light from parts of the negative, and is provided at the bottom of the lower guide-rod a with sleeves F, which fit upon the rods D and enable the frame to slide along the same and vary the distance between the screens and the camera, and the said sleeves may be provided with set-screws to engage the rods D and retain them in any desired position.

The number of the screens B may be varied, but I have only shown two in the accompanying drawings; and I desire it to be understood that I do not limit myself to the precise details of construction herein shown and described, as I may, without departing from the spirit of my invention, place the screen inside the camera between the lens and the negative.

When it is desired to take a group-picture composed of a single object placed in various positions, the object is posed and a portion of the negative is exposed and impressed therewith, the sensitiveness of the other portions of the negative being preserved by the screens B, which exclude the light therefrom. Then the light is entirely shut off from the negative and the object is again posed and another portion of the negative is exposed. This operation is continued until the desired number of figures has been introduced into the group, and the negative is afterward developed in the usual manner.

From the foregoing it will clearly be seen that the adjustable frame and the screens sliding within the same may be arranged to exclude the light from any portion of the negative to preserve the sensitiveness thereof, and that the negative may be exposed a number of times to permit the formation of a group-picture composed of an object or objects posed in various positions without any indications of successive exposures appearing on the negative.

Having described the invention, I claim—

1. A frame mounted in front of a camera and capable of adjustment relative thereto, and provided with screens sliding within the same, whereby the said screens may be arranged to exclude the light from any portion or portions of a negative, substantially as described.

2. The frame mounted in front of the camera and composed of the guide-strip, V-shaped in cross-section, and the side pieces connecting the ends of said strips, and the screens provided with corresponding V-shaped grooves, whereby they are retained between the guide-strips, substantially as and for the purpose described.

3. The herein-described camera attachment, comprising the rods D, adapted to be secured to the front of a camera, the rectangular frame A, provided with sleeves F, fitting upon the said rods and enabling the frame to be adjusted relatively to the camera, and the screens B, sliding within the frame, substantially as and for the purpose described.

4. The herein-described camera attachment, comprising the rods D, adapted to be secured to the front of a camera by the disks E, the rectangular frame A, consisting of the V-shaped guide-strips and the side pieces, the screens B, provided with corresponding V-shaped grooves, whereby they are retained in between the guide-strips, substantially as described.

In testimony that I claim the foregoing as my own I have hereto affixed my signature in presence of two witnesses.

ORLO LENARD MUNGER.

Witnesses:
E. A. WEMPLE,
WM. C. PONURT.